United States Patent [19]
Otten et al.

[11] Patent Number: 5,157,904
[45] Date of Patent: Oct. 27, 1992

[54] SUGAR-CANE HARVESTING MACHINE

[75] Inventors: Hillrich Otten; Guenter Liegers, both of Harsewinkel; Karl Landwehr, Hagen; Walter Foegeling, Herzebrock-Clarholz; Rudolf Arnold, Saulgau, all of Fed. Rep. of Germany

[73] Assignee: Claas OHG, Harsewinkel, Fed. Rep. of Germany

[21] Appl. No.: 694,922

[22] Filed: May 2, 1991

[30] Foreign Application Priority Data

May 17, 1990 [DE] Fed. Rep. of Germany ....... 4015894

[51] Int. Cl.$^5$ ...................... A01D 45/10; A01D 41/14
[52] U.S. Cl. ......................................... 56/2; 56/14.3; 56/14.5; 56/60; 56/157
[58] Field of Search ..................... 56/13.5, 13.9, 2, 60, 56/14.5, 14.3, 157, 119, DIG. 9, 94

[56] References Cited

U.S. PATENT DOCUMENTS

| | | | |
|---|---|---|---|
| 3,324,637 | 6/1967 | Ashton et al. | 56/2 X |
| 3,791,117 | 2/1974 | Lawrence | 56/13.9 X |
| 4,099,365 | 7/1978 | Hudson | 56/13.5 |
| 4,236,369 | 12/1980 | Decoene | 56/60 |
| 4,722,174 | 2/1988 | Landry et al. | 56/14.5 |

FOREIGN PATENT DOCUMENTS

| | | |
|---|---|---|
| 1482894 | 7/1969 | Fed. Rep. of Germany . |
| 7538455 | 12/1975 | Fed. Rep. of Germany . |
| 3033635 | 3/1981 | Fed. Rep. of Germany . |
| 2713502 | 11/1986 | Fed. Rep. of Germany . |

OTHER PUBLICATIONS

"Agragtechnik", vol. 27, No. 10, Oct., 1977, *Die Mechanisierung der Zuckerrohrernte in der Republik Kuba,* Leon pp. 455-458.

*Primary Examiner*—Stephen J. Novosad
*Attorney, Agent, or Firm*—Spencer, Frank & Schneider

[57] ABSTRACT

In a sugar-cane harvesting machine with a mobile machine base frame and a chopping mechanism (8), harvesting attachments which can be optionally fixed on the machine base frame are provided for adapting to different harvesting circumstances and terrain conditions, of which harvesting attachments one is designed for single-row harvesting and another for multi-row harvesting. The harvesting attachments contain row dividers (5, 6, 7), a mowing mechanism (23, 24, 25, 26) and a feeding mechansim (19, 20, 21, 41, 42). The multi-row harvesting attachment projects beyond the chopping mechanism (8) predominantly on one side so that symmetry is produced with respect to the running gear. In the uniform feeding space behind the mowing mechanism, the stream of material is laterally constricted and, specifically, preferably on one side.

7 Claims, 6 Drawing Sheets

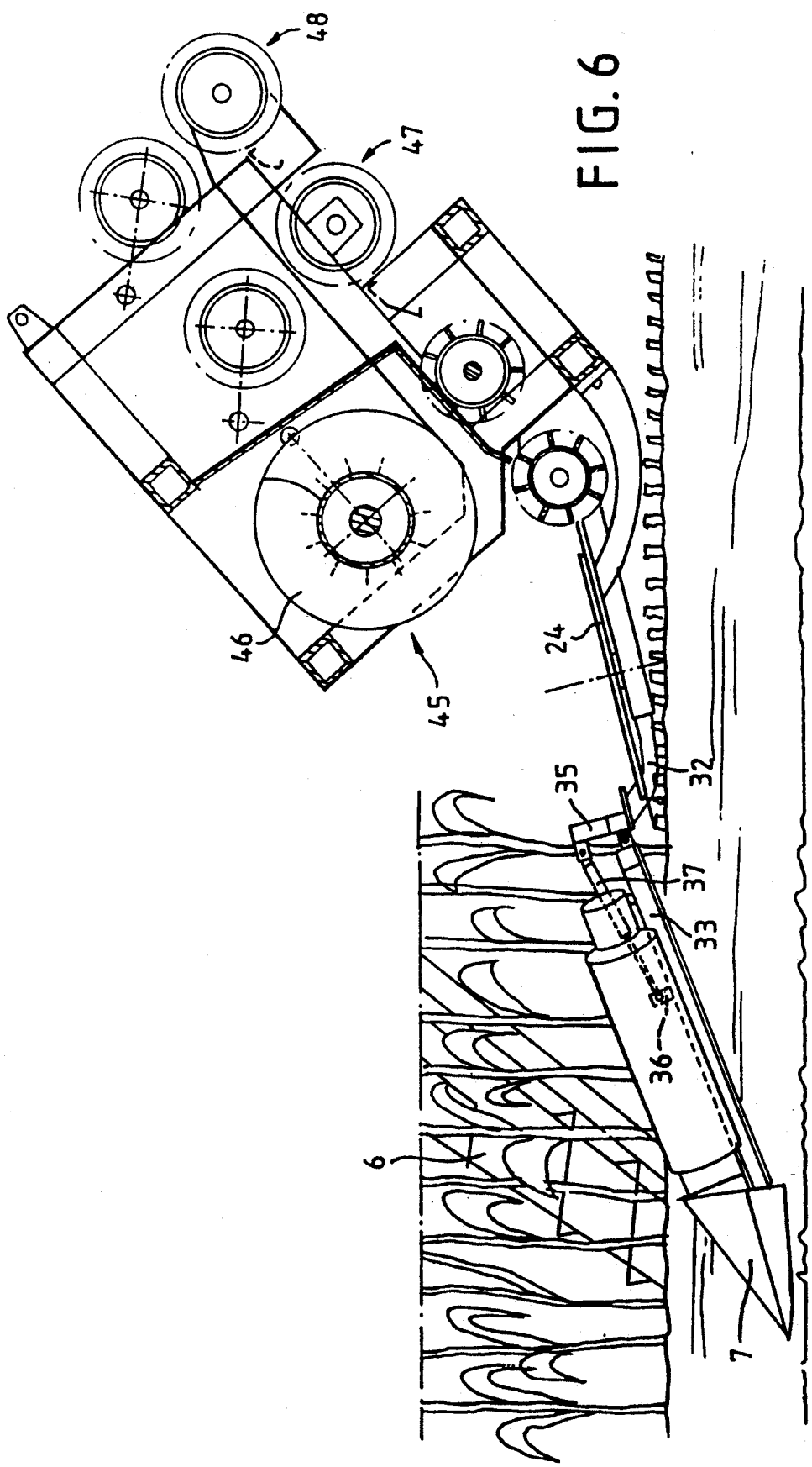

SUGAR-CANE HARVESTING MACHINE

BACKGROUND OF THE INVENTION

The invention relates to a sugar-cane harvesting machine with a mobile machine base frame, a chopping mechanism and a harvesting attachment which is mounted on the front and contains a mowing mechanism and a feeding mechanism in order to separate the stalks from the roots and to feed them to the chopping mechanism.

Machines of this kind are known for harvesting one row of sugar-cane plants in each case. However, quite often the harvesting conditions and nature of the terrain make it appear desirable to harvest two or more rows of plants at the same time. In addition, the chopping mechanisms used are usually so efficient that an increased throughput of harvested crops can be readily processed.

SUMMARY OF THE INVENTION

The invention is based on the object of providing a sugar-cane harvesting machine which can be matched up to different harvesting conditions in such a way that it can always be operated with the best possible performance.

This object is achieved according to the invention, starting from a sugar-cane pick-up loader of the type mentioned at the beginning, by means of harvesting attachments which can be optionally fixed on the machine base frame, of which attachments one is designed for single-row harvesting and another for multi-row harvesting. In this way, the harvesting attachments can be completely changed according to requirements. Multi-row or multi-column means that a plurality of rows of plants lying next to one another, in particular two, can be harvested at the same time, that is to say that dividing devices are mounted right at the front on the harvesting attachment which take hold of the plants, in each case in one row, from the left and the right, feed them to separate mowing devices, in particular pairs of mower rotors, previously cut off the plant tips if necessary and then feed the stalks backwards to the chopping mechanism. With two-row operation the harvesting yield is practically doubled.

Even a two-row harvesting attachment projects to a considerable extent beyond the width of the chopping mechanism and of the processing devices connected downstream of it, i.e. the so-called basic machine. Essentially two variants of the arrangement which require different conceptions of the feeding mechanism come into consideration. As a particularly advantageous option, it is proposed that the multi-row harvesting attachment is arranged with respect to the basic machine in such a way that it protrudes over its entire width predominantly on one side. This means that the harvested crops of the one row of plants arrives approximately on the same straight path to the chopping mechanism as in single-row harvesting. The harvested crops originating from the additional, second row of plants are, however, forced away laterally towards the inlet of the chopping mechanism. This arrangement is particularly advantageous if, as is known per se, the basic machine is mounted on one side in the lateral direction on the running gear. The multi-row harvesting attachment is thus seated laterally symmetrically on the running gear, by means of which the directional control is increased.

On the other hand, in particular with a central arrangement of the basic machine with respect to the running gear, it can be advantageous if the multi-row harvesting attachment is arranged with respect to the basic machine in such a way that it protrudes over its overall width on both sides. Thus, on both sides a deflection or transverse displacement of the harvested crops towards the center must be carried out, but in each case by relatively small amounts, so that the outlay in terms of devices for this is reduced.

However the deflection occurs it is proposed as particularly advantageous that behind the mowing mechanism a common feeding space is provided for the mown-off stalks of a plurality of rows of plants, which feeding space narrows towards the back to a smaller width.

With respect to the deflection means, it is proposed as a preferred embodiment that, on at least one side of the feeding space, feeding drums with approximately vertical axes with respect to the main direction of flow be arranged offset with respect to one another in a laterally stepped manner. These feeding drums force the stalks off to the side and, nevertheless, also bring about forward feeding. Alternatively, it is proposed that behind the mowing mechanism a horizontal feeding rotor extending transversally with respect to the main direction of flow is arranged which is provided on one partial section of its length with axis-parallel feeding strips and on at least one end section with augers which feed towards the partial section. This rotor therefore acts partially tangentially as a feeding roller and partially axially as a feeding screw.

Finally, one feature which is important for the operation of a multi-row harvesting attachment is to be emphasized. The inner row divider device arranged between two laterally outer row dividers which is pushed between two rows of plants is preferably constructed in such a way that its inclination changes in the direction of travel and it can be set in particular at a steep position and a plane, backwards inclined position. If the plant stock has been strongly affected by wind and the stalks are mostly at an angle or lying, the plane setting of the central row divider device has the advantage that the mass of harvested crops when lying is pushed away over the latter and passes to the chopper without resistance. In this process, a large harvest yield is obtained but the stalks which are fed to the chopper in different orientations are chopped into pieces of unequal lengths. If this is felt to be a disadvantage and a particularly large emphasis is placed on uniform chopped material, the central row divider device is given a steeper setting, approximately at the same angle as the two outer row dividers and the lying stalks are as a result placed upright and are thus fed to the chopping mechanism with a uniform orientation.

BRIEF DESCRIPTION OF THE DRAWINGS

Exemplary embodiments of the invention are explained below with reference to the drawing, in which:

FIG. 6 shows a vertical partial section along the line VI—VI of the harvesting attachment according to FIG. 5.

DETAILED DESCRIPTION OF PREFERRED EMBODIMENTS

Figure 1:
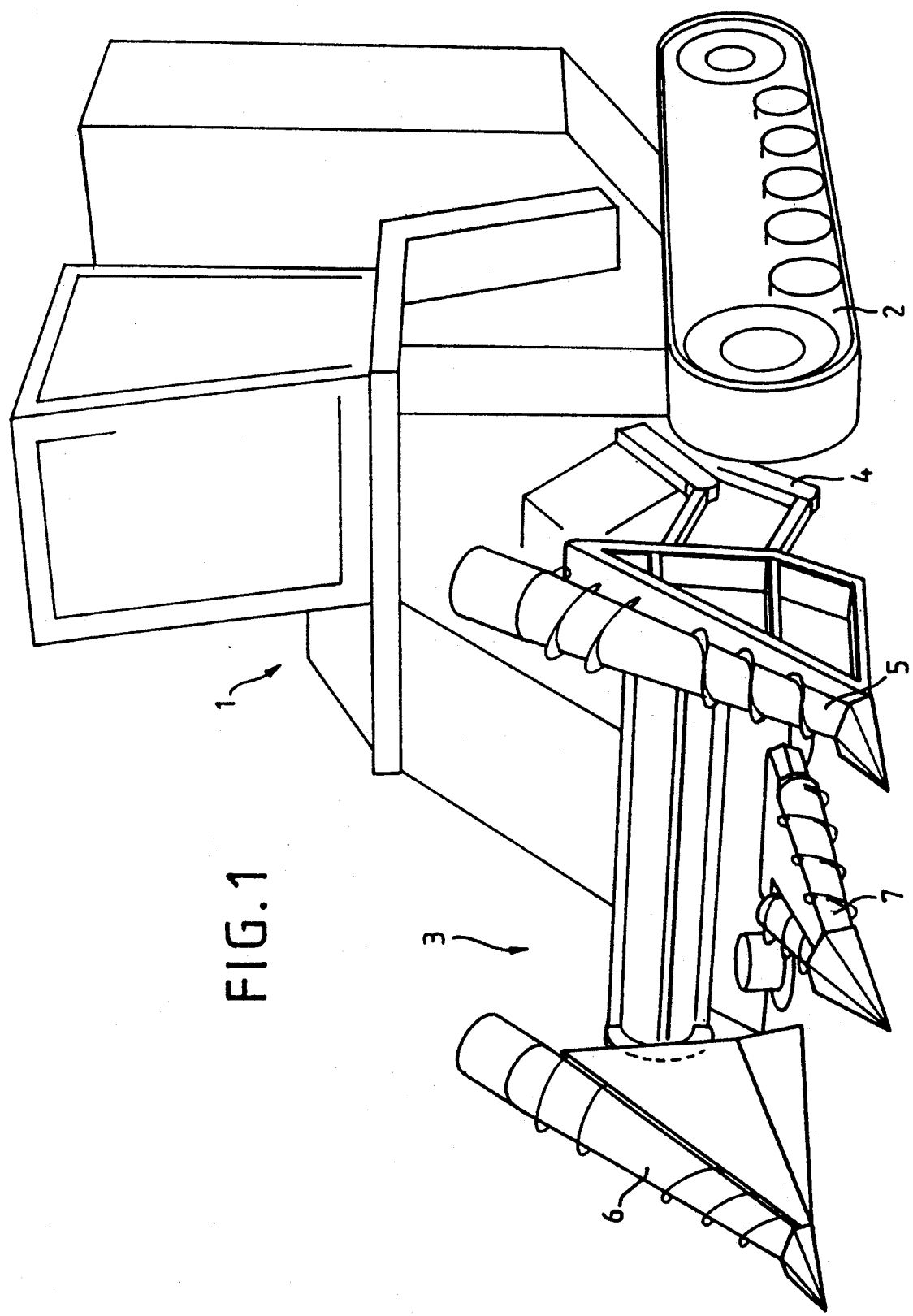
FIG. 1 shows a perspective view of a sugar-cane harvesting machine with two-row harvesting attachment.

According to FIG. 1, the machine base frame consists of a housing 1 which rests on a running gear 2 with crawlers. The machine base frame bears a two-row harvesting attachment 3 with a frame 4 as basic structure and with three row dividers, seated right at the front, namely two laterally outer dividers 5 and 6 and one inner dividing device 7 arranged in the center.

Figure 2:
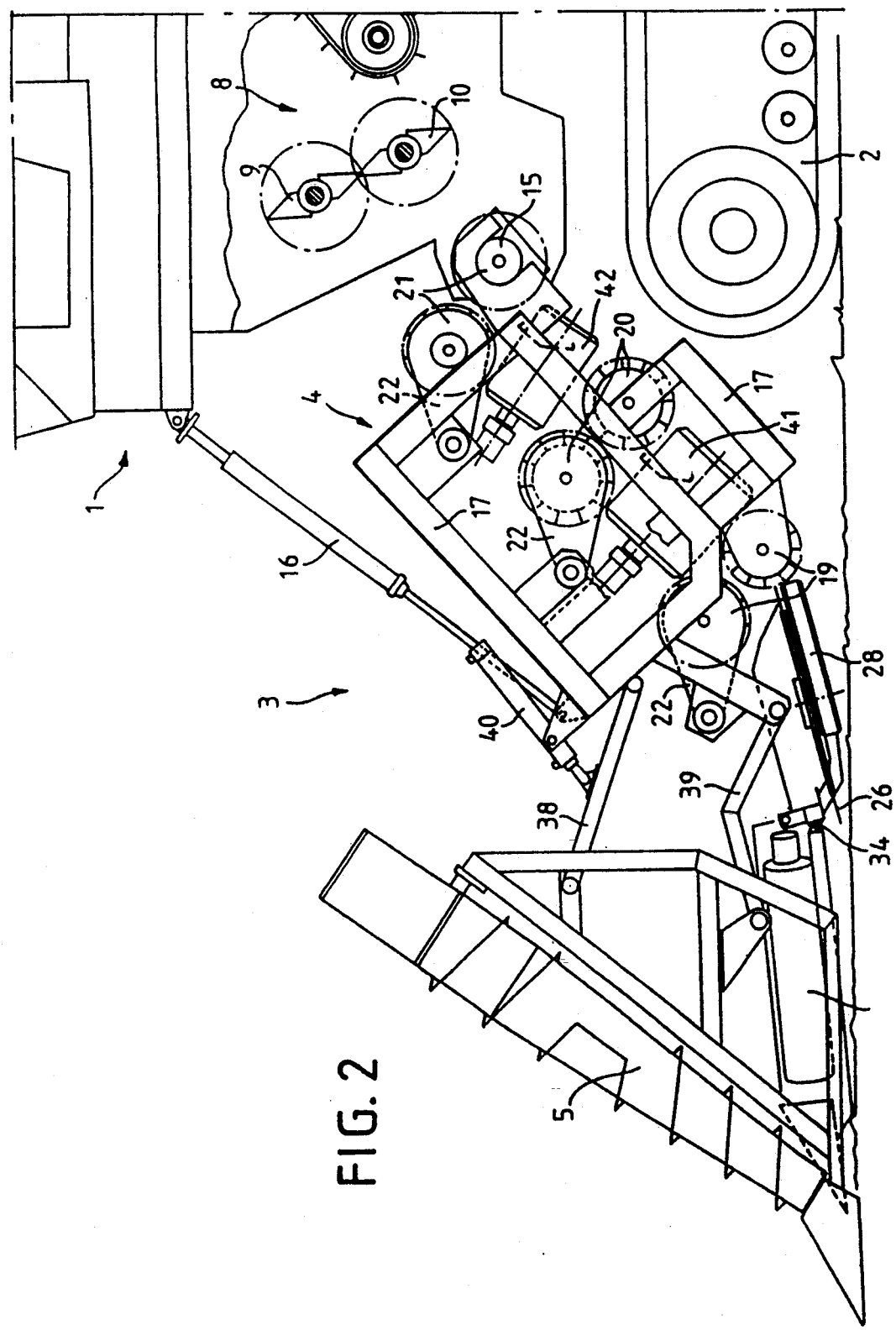
FIG. 2 shows a side view of the front part of the machine according to FIG. 1 with details in particular of the harvesting attachment.
Figure 3:
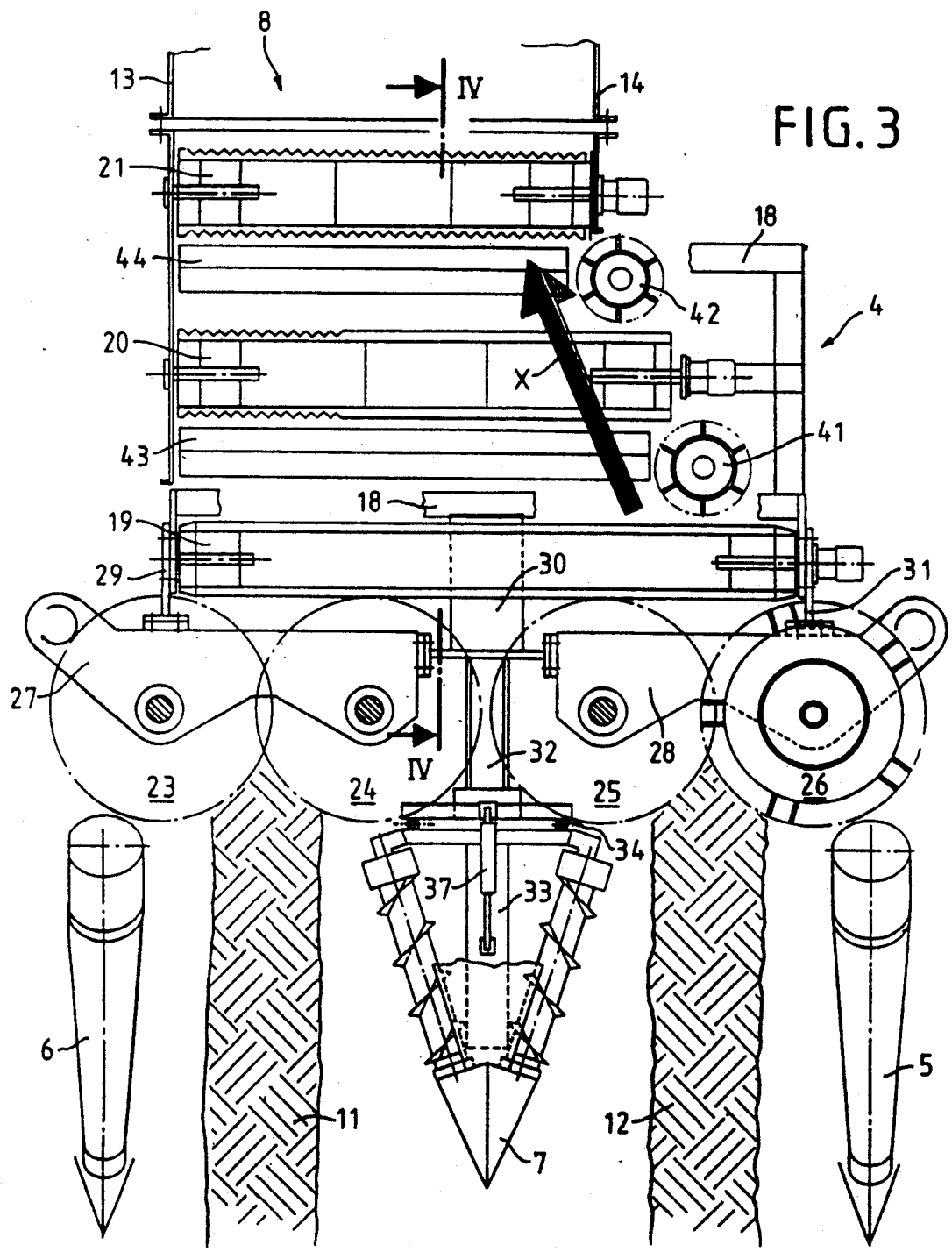
FIG. 3 shows a top view of the partially horizontally cut-away arrangement according to FIG. 2.
Figure 4:
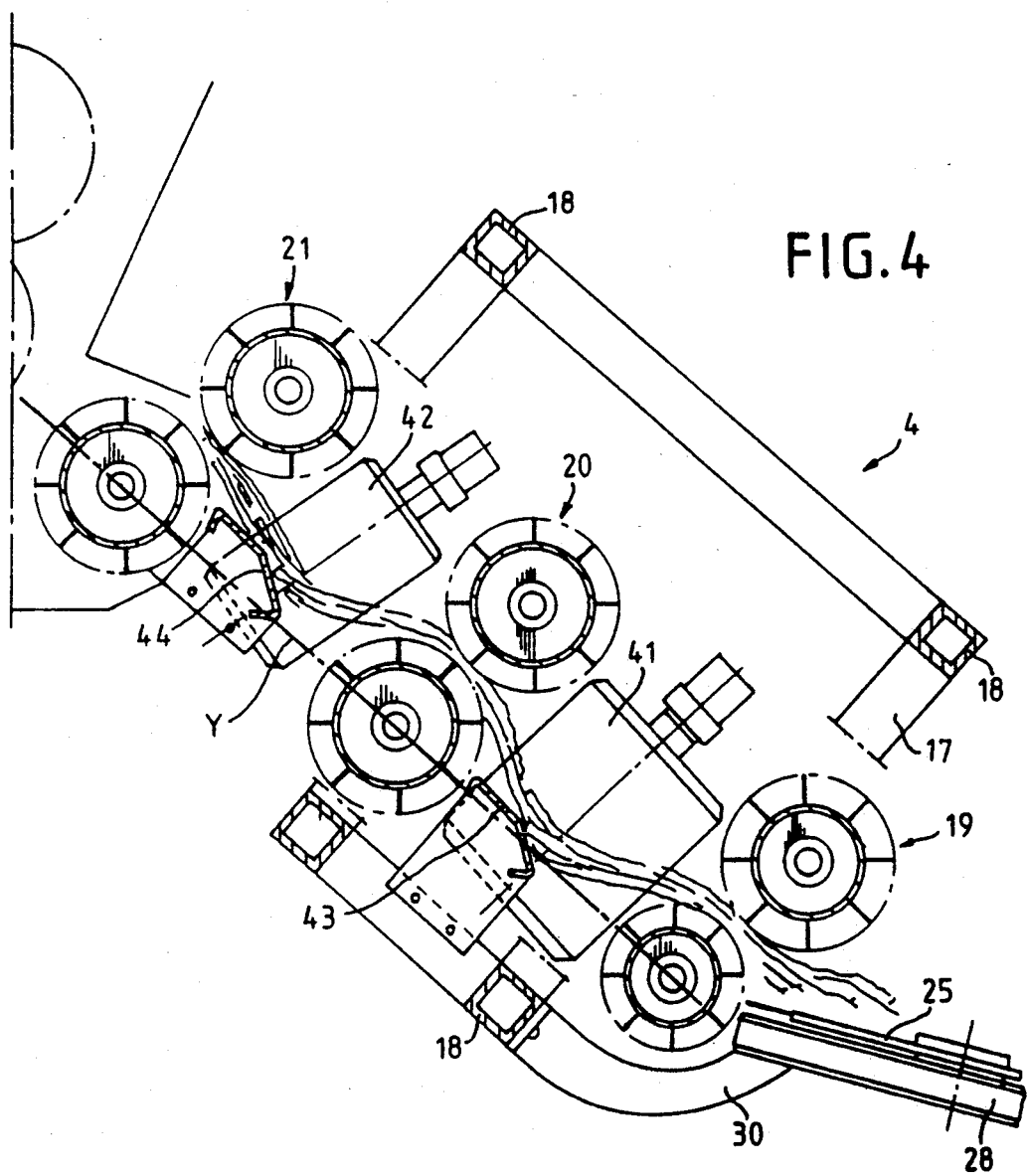
FIG. 4 shows a vertical partial section along the line IV—IV in FIG. 3 on a larger scale.

The housing 1 contains, as shown by FIG. 2, a chopping mechanism 8 whose interacting blade rollers are designated by 9 and 10. In FIG. 3, two sugar-cane rows of plants 11 and 12 are indicated in a top view. The crawlers run to the right and left beside these two rows of plants. The chopping mechanism 8 and the rest of the basic machine, whose side walls are designated by 13 and 14, are substantially narrower than the running gear 2 and arranged off-center in the lateral direction in respect to the latter. Correspondingly, the harvesting attachment 3 also protrudes predominantly on one side over the width of the chopping machine 8. Near to the chopping mechanism, articulated coupling points 15 (FIG. 2) are arranged on the machine base frame. Furthermore, the attachment is held and its height adjusted by means of a lifting cylinder 16.

The frame 4 of the harvesting attachment has vertically arranged side parts 17 which are connected by cross braces 18. This open frame 4 serves for receiving interacting feeding roller pairs 19, 20 and 21. The respective upper feeding rollers are swivelably held by means of articulated arms 22 in the frame 4. The lower feeding rollers are mounted fixedly in the frame.

Four disk-shaped mowing rotors 23, 24, 25 and 26 with their associated drive housings 27 and 28 are arranged, viewed in the direction of travel, in front of the feeding roller pair 19. In each case two mowing rotors form a mower for one of the plant rows 11 and 12. The gear housings 27 and 28 are supported in the central region between the mowing rotor pairs and at the level of the mowing rotors 23 and 26 on the frame 4 via consoles 29, 30 and 31. An elongation part 32 of the support 30 forms a connection to the carrier frame 33 of the inner dividing device 7 and is movably connected to the latter by means of joints 34 with horizontal axis. At the end of the elongation part 32 a support 35 is arranged and a support 36 is arranged on the carrier frame 33 (see also FIG. 6), between which a lifting cylinder 37 supports the dividing device 7 in a height-adjustable manner. The details concerning the adjustment of inclination of this central dividing device are not shown. The outer dividers 5 and 6 are arranged in a height-adjustable manner on the frame 4 by means of drive links 38 and 39 and a lifting cylinder 40.

Since the chopping mechanism 8 arranged between the side walls 13 and 14 of the basic machine is sufficient for the processing of the harvested mass of stalks, the entire harvested crop is fed to the said chopping mechanism. For this purpose, a one-sided constriction of the stream of harvested crop in the direction of the arrow X is required between the mowing rotors 23 to 26 and the chopping mechanism 8. For this purpose, in the example there are two feeding drums 41 and 42 arranged offset with respect to one another in the lateral direction, the axes of which are perpendicular to the axes of the feeding roller pairs 19 to 21. In addition, the feeding roller pairs have stepped lengths. The second and third feeding roller pair following in the feeding direction are each smaller, the ends lying behind one another on one side. The feeding drums 41 and 42 take care here of the deflection of the stream of harvested crop whilst the shortened feeding roller pairs 20 and 21 pass on the constricted stream.

For the purpose of separating off unusable parts of the plant and dirt towards the bottom, the feeding roller pairs 19 to 21 are mounted with sufficient spacing from one another in the frame 4. The spaces between the respective lower feeding rollers are closed in certain areas over the entire width using bow-like metal plates 43 and 44. In this way it is achieved that the stalks which may stick out downwards from the stream of harvested crop are seized and fed to the associated roller pair. The metal plates 43 and 44 are arranged inclined towards the stream of harvested crop, the end of each metal plate pointing in the direction of the chopping mechanism 8 not coming to rest below the axis plane Y of the lower feeding rollers.

Figure 5:
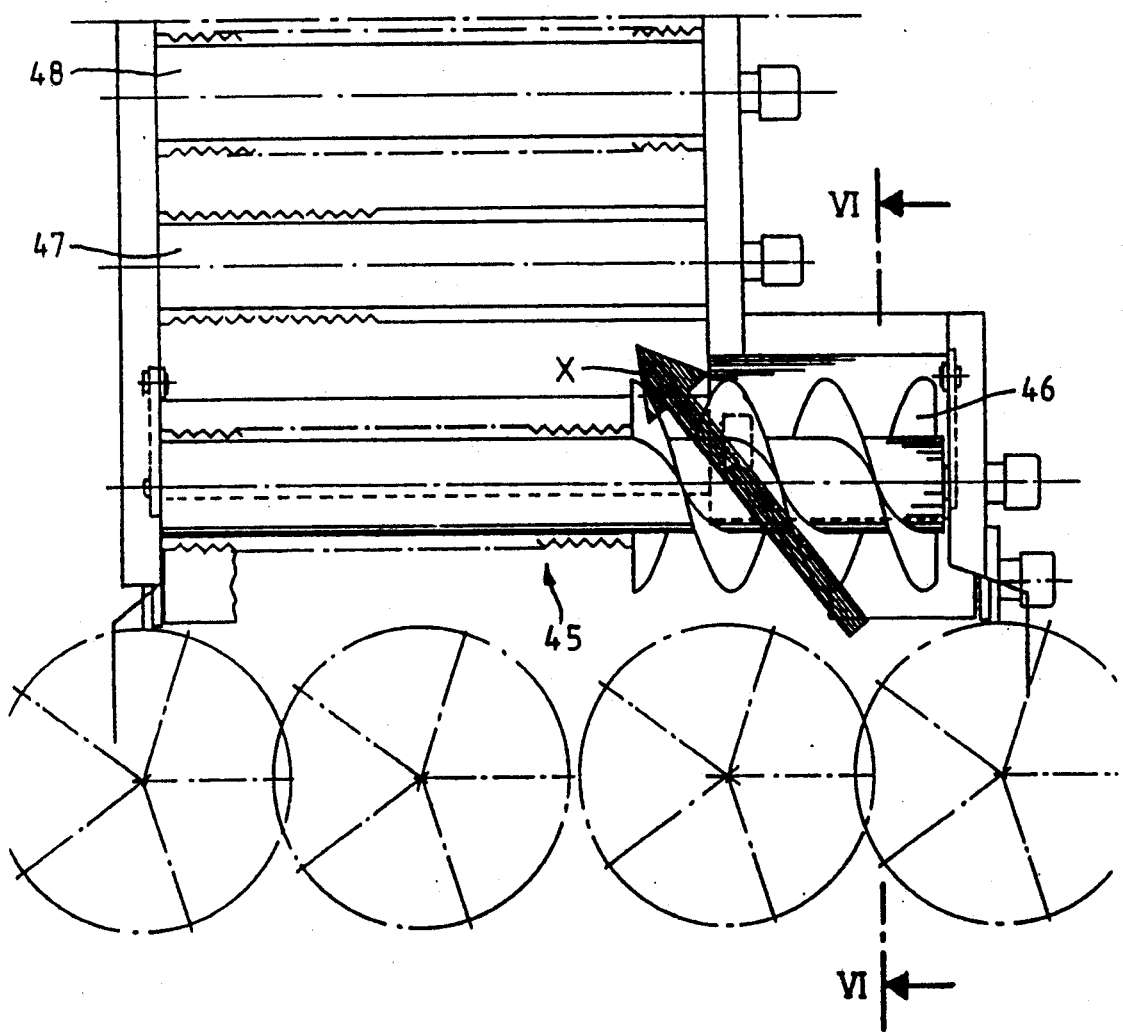
FIG. 5 shows a top view of a modified form of a two-row harvesting attachment.

FIGS. 5 and 6 show a further exemplary embodiment of a device for the lateral constriction of the stream of harvested crop consisting predominantly of stalks. According to this, the function of the upper feeding roller of the feeding roller pair directly adjoining the mowing rotors is changed over to a feeding rotor 45. Its right-hand section (viewed in the direction of travel) which slightly protrudes beyond the half length is constructed as a feeding roller and, for this purpose, provided with serrated longitudinal strips like the other feeding rollers. In contrast, augers 46 are welded onto the left section. Here, i.e. in the region of the mowing rotors 25 and 26 of the plant row 12, the rotor acts as a feeding screw which forces the entire stream of harvested crop out of this region towards the center. The deflection thus occurs on a shorter longitudinal feeding section than that of the first exemplary embodiment so that the second and third feeder roller pair 47 and 48 of this exemplary embodiment can be of equal length, but substantially shorter than the feeding rotor 45.

The drives envisaged for the feeding rollers are predominantly oil motors which are indicated in the drawing but not separately numbered.

We claim:

1. In a sugar-cane harvesting machine with a mobile machine base frame, a chopping mechanism and a harvesting attachment means which is mounted on a front end of the frame and contains a mowing mechanism and a feeding mechanism in order to separate stalks from roots and to feed the stalks to the chopping mechanism, the improvement wherein said harvesting attachment means comprises harvesting attachments for selective attachment on the machine base frame, one said attachment being one for single-row harvesting and another said attachment being for multi-row harvesting.

2. Machine according to claim 1, wherein the multi-row harvesting attachment is arranged with respect to the basic machine so that it protrudes over its entire width on both sides.

3. Machine according to claim 1, wherein the multi-row harvesting attachment is arranged with respect to the basic machine so that it protrudes over its entire width predominantly on one side.

4. Machine according to claim 1, wherein behind the mowing mechanism a common feeding space is provided for the mown-off stalks of a plurality of rows of plants, which feeding space narrows towards the back to a smaller width.

5. Machine according to claim 4, further comprising feeding drums having approximately vertical axes with respect to the main direction of flow arranged on at least one side of the feeding space and offset with respect to one another in a laterally stepped manner.

6. Machine according to claim 4, further comprising a horizontal feeding rotor arranged behind the moving mechanism and extending transversally with respect to the main direction of flow, said feeding rotor being provided on one partial section of its length with axis-parallel feeding strips and on at least one end section with augers which feed towards the partial section.

7. Machine according to claim 1, wherein the multi-row harvesting attachment comprises three row dividers including an inner row dividing device arranged between two laterally outer row dividers, said inner row dividing device having means for changing its inclination in the direction of travel so that it can be set in particular at a steep position and a plane, backwards inclined position.

* * * * *

UNITED STATES PATENT AND TRADEMARK OFFICE
CERTIFICATE OF CORRECTION

PATENT NO. : 5,157,904
DATED : October 27th, 1992
INVENTOR(S) : Hillrich OTTEN et al.

It is certified that error appears in the above-identified patent and that said Letters Patent is hereby corrected as shown below:

On the title page: Item

[75], change "Guenter Liegers" to

--Guenter Leigers--.

Signed and Sealed this

Fifth Day of October, 1993

Attest:

BRUCE LEHMAN

Attesting Officer

Commissioner of Patents and Trademarks